United States Patent
Mita et al.

(10) Patent No.: US 8,736,409 B2
(45) Date of Patent: May 27, 2014

(54) SOLENOID FOR ELECTROMAGNETIC VALVE

(75) Inventors: Minehiko Mita, Tsukubamirai (JP); Jiro Karasaki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 22 days.

(21) Appl. No.: 13/522,585

(22) PCT Filed: Feb. 8, 2011

(86) PCT No.: PCT/JP2011/052568
§ 371 (c)(1),
(2), (4) Date: Jul. 17, 2012

(87) PCT Pub. No.: WO2011/102257
PCT Pub. Date: Aug. 25, 2011

(65) Prior Publication Data
US 2012/0292544 A1    Nov. 22, 2012

(30) Foreign Application Priority Data
Feb. 17, 2010 (JP) .................. 2010-032654

(51) Int. Cl.
*H01F 3/00* (2006.01)
*H01F 7/08* (2006.01)

(52) U.S. Cl.
USPC ............ 335/281; 335/279; 251/129.15

(58) Field of Classification Search
USPC ............ 335/279, 281; 251/129.15
See application file for complete search history.

(56) References Cited

U.S. PATENT DOCUMENTS

| 5,535,783 A | 7/1996 | Asou et al. |
| 5,687,698 A * | 11/1997 | Mastro et al. ............ 123/568.26 |
| 6,213,445 B1 * | 4/2001 | Sato et al. ............ 251/48 |

(Continued)

FOREIGN PATENT DOCUMENTS

| JP | 2002 188745 | 7/2002 |
| JP | 2005 277289 | 10/2005 |

(Continued)

OTHER PUBLICATIONS

Notification of Reason for Refusal issued Aug. 13, 2013 in Japanese Patent Application No. 2010-032654 (with English translation).

(Continued)

*Primary Examiner* — Mohamad Musleh
(74) *Attorney, Agent, or Firm* — Oblon, Spivak, McClelland, Maier & Neustadt, L.L.P.

(57) ABSTRACT

A solenoid for an electromagnetic valve, which reduces a magnetic resistance resulting from a space between a movable iron core and a magnetic plate. A magnetic plate provided around a movable iron core forming a magnetic path between a magnetic frame and the movable iron core includes an extending portion extending toward a stationary iron core along a surface of the movable iron core. An area Sa of an opposing portion of an outer periphery of the movable iron core opposing an inner peripheral surface of the magnetic plate and a sectional area Sb of the movable iron core satisfy K=Sa/Sb, K>1. An axial length h of the inner peripheral surface of the magnetic plate and a length L from an attracting-force acting surface of the movable iron core located at a position separate from the stationary iron core to a front end portion of the magnetic plate satisfy 2≤K≤[value of K when h=L].

6 Claims, 5 Drawing Sheets

(56) References Cited

U.S. PATENT DOCUMENTS

| | | | |
|---|---|---|---|
| 6,542,059 B2 | 4/2003 | Sato et al. | |
| 6,655,411 B2 | 12/2003 | Sato et al. | |
| 6,664,877 B2 | 12/2003 | Sato et al. | |
| 6,698,713 B2 | 3/2004 | Sato et al. | |
| 6,748,976 B2 | 6/2004 | Sato et al. | |
| 6,749,175 B2 | 6/2004 | Sato et al. | |
| 7,004,450 B2 | 2/2006 | Yoshimura et al. | |
| 7,273,206 B2 | 9/2007 | Sato et al. | |
| 7,280,021 B2 * | 10/2007 | Nagasaki | 335/255 |
| 7,377,481 B2 | 5/2008 | Narita et al. | |
| 7,959,129 B2 | 6/2011 | Matsumoto | |
| 8,037,901 B2 | 10/2011 | Matsumoto et al. | |
| 2002/0121620 A1 * | 9/2002 | Sato et al. | 251/129.15 |
| 2003/0030019 A1 * | 2/2003 | Sato et al. | 251/129.15 |
| 2004/0084649 A1 * | 5/2004 | Yoshimura et al. | 251/129.15 |
| 2005/0092951 A1 * | 5/2005 | Groetzinger | 251/129.15 |
| 2005/0211938 A1 | 9/2005 | Ryuen et al. | |
| 2007/0178753 A1 * | 8/2007 | Mita | 439/517 |
| 2008/0203339 A1 | 8/2008 | Kato et al. | |
| 2008/0203342 A1 | 8/2008 | Ryuen et al. | |
| 2008/0272871 A1 * | 11/2008 | Bamber et al. | 335/261 |
| 2008/0308756 A1 | 12/2008 | Yoshimura | |
| 2010/0019180 A1 * | 1/2010 | Voss | 251/129.15 |
| 2011/0215271 A1 * | 9/2011 | Voss et al. | 251/129.15 |

FOREIGN PATENT DOCUMENTS

| | | |
|---|---|---|
| JP | 2005-277289 | 10/2005 |
| JP | 2005 277292 | 10/2005 |
| JP | 2005-277292 | 10/2005 |
| JP | 2009 287757 | 12/2009 |
| JP | 2009-287757 | 12/2009 |
| TW | 291940 | 11/1996 |
| TW | 536599 | 6/2003 |

OTHER PUBLICATIONS

International Search Report Issued May 17, 2011 in PCT/JP11/52568 Filed Feb. 8, 2011.

Combined Office Action and Search Report issued Jul. 30, 2013 in Taiwanese Patent Application No. 100104558 (with English translation).

* cited by examiner

SOLENOID FOR ELECTROMAGNETIC VALVE

TECHNICAL FIELD

The present invention relates to a solenoid for an electromagnetic valve, which drives a movable iron core through magnetization and de-magnetization of an exciting coil, and more specifically, to a solenoid for an electromagnetic valve, which enhances magnetic efficiency with a simple structure change without adding any special component to an existing solenoid for an electromagnetic valve.

BACKGROUND ART

For example, as described in Patent Literature 1, there has been known a solenoid for an electromagnetic valve, in which a stationary iron core is mounted in a center hole of a bobbin with an exciting coil wound therearound, a movable iron core is slidably inserted in the center hole, and a magnetic path is connected between a magnetic frame shaped like a cover surrounding the bobbin and an end of the stationary iron core opposite the movable iron core. A magnetic plate for forming a magnetic path between the magnetic frame and the movable iron core is provided around a side of the movable iron core opposite an attracting-force acting surface of the stationary iron core, and the movable iron core is attracted toward the stationary iron core by application of current to the exciting coil or is separated from the stationary iron core by biasing force of a return spring so as to open and close a valve member. A portion of the magnetic plate opposing an outer peripheral surface of the movable iron core extends toward the stationary iron core along a surface of the movable iron core.

In the above-described solenoid for the electromagnetic valve, a magnetic path is formed to reach from the stationary iron core to the movable iron core through the magnetic frame surrounding the bobbin and the magnetic plate and to return to the stationary iron core. A gap between the movable iron core and the stationary iron core and a space between the movable iron core and the magnetic plate are great magnetic resistances in the magnetic path. Even if a relatively great magnetic resistance is produced in other portions, it is relatively easy to reduce the magnetic resistance by a structure change.

Since the gap between the movable iron core and the stationary iron core corresponds to a stroke of the movable iron core during energization of the exciting coil, the magnetic resistance can be reduced by minimizing the stroke by a valve structure or the like, but the gap is basically essential. While the space between the movable iron core and the magnetic plate is also a great magnetic resistance, the space is necessary to cause the movable iron core to make a stroke without contact with the magnetic plate. However, magnetic efficiency of the solenoid for the electromagnetic valve can be enhanced by reducing the magnetic resistance in some way.

CITATION LIST

Patent Literature

PTL 1: Japanese Unexamined Patent Application Publication No. 2002-188745

SUMMARY OF INVENTION

A technical object of the present invention is to provide a solenoid for an electromagnetic valve, which reduces a magnetic resistance resulting from a space between a movable iron core and a magnetic plate by a simple structure change without adding any special component to an existing solenoid for an electromagnetic valve and which thereby enhances magnetic efficiency.

To achieve the object, the present invention provides a solenoid for an electromagnetic valve, including: a bobbin on which an exciting coil is wound; a stationary iron core mounted in a center hole of the bobbin and having an attracting-force acting surface at a front end of the stationary iron core; a movable iron core slidably inserted in the center hole of the bobbin, and having an attracting-force acting surface opposing the attracting-force acting surface of the stationary iron core, the movable iron core being attracted to the stationary iron core by energization of the exciting coil and being biased by a return spring in a direction away from the stationary iron core; a magnetic frame shaped like a cover surrounding the bobbin and connected to the stationary iron core at a rear end of the stationary iron core by a magnetic path; and a magnetic plate provided around the movable iron core to form a magnetic path between the magnetic frame and the movable iron core. The magnetic plate includes a plate body having an outer periphery in contact with the magnetic frame, and an extending portion provided on an inner peripheral side of the plate body to extend toward the stationary iron core along a surface of the movable iron core. An area Sa of an opposing portion of an outer periphery of the movable iron core opposing an inner peripheral surface of the magnetic plate and a sectional area Sb of a cross section of the movable iron core orthogonal to an axis thereof satisfy the following condition:

$K = Sa/Sb, K > 1$, and an axial length h of the inner peripheral surface of the magnetic plate and a length L from the attracting-force acting surface of the movable iron core located at a position separated from the stationary iron core by the return spring to a front end portion of the magnetic plate satisfy the following condition:

$2 \leq K \leq$ [value of $K$ when $h=L$].

In the present invention, preferably, an extension length of the extending portion of the magnetic plate from the plate body is more than a thickness of the plate body.

In a preferred embodiment of a solenoid for an electromagnetic valve of the present invention, sections of the stationary iron core, the movable iron core, the center hole of the bobbin, and an inner hole of the magnetic plate have any of a circular shape, an elliptic shape, and a rectangular shape.

According to the solenoid for the electromagnetic valve of the present invention described in detail above, it is possible to obtain a solenoid for an electromagnetic valve, which reduces a magnetic resistance resulting from a space between a movable iron core and a magnetic plate by a simple structure change without adding any special component to an existing solenoid for an electromagnetic valve and which thereby enhances magnetic efficiency.

DESCRIPTION OF EMBODIMENTS

An embodiment of the present invention will be described in detail below with reference to the drawings.

Figure 1:
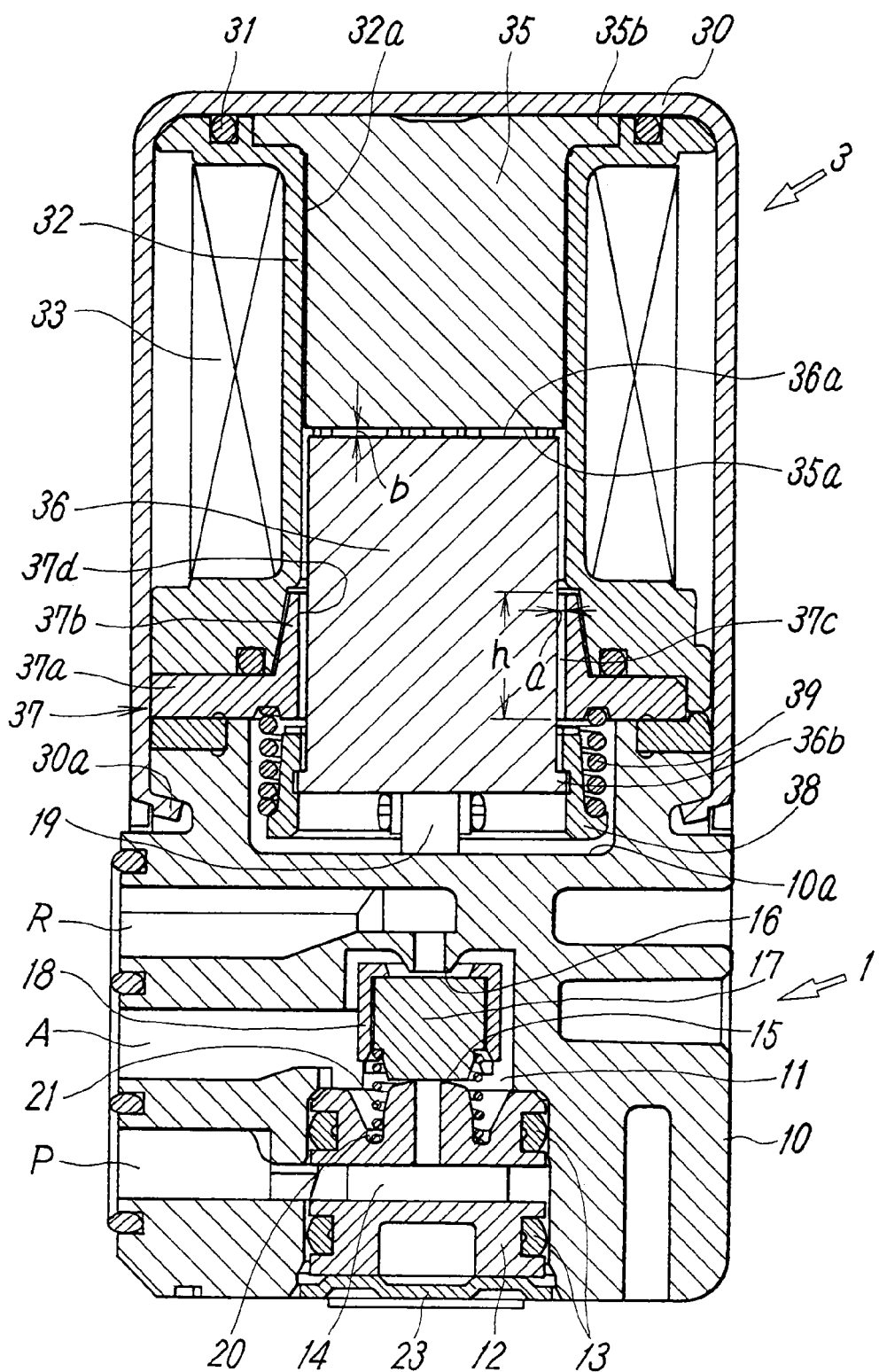
FIG. 1 is a longitudinal sectional view illustrating an embodiment of an electromagnetic valve including a solenoid according to the present invention.
Figure 2:
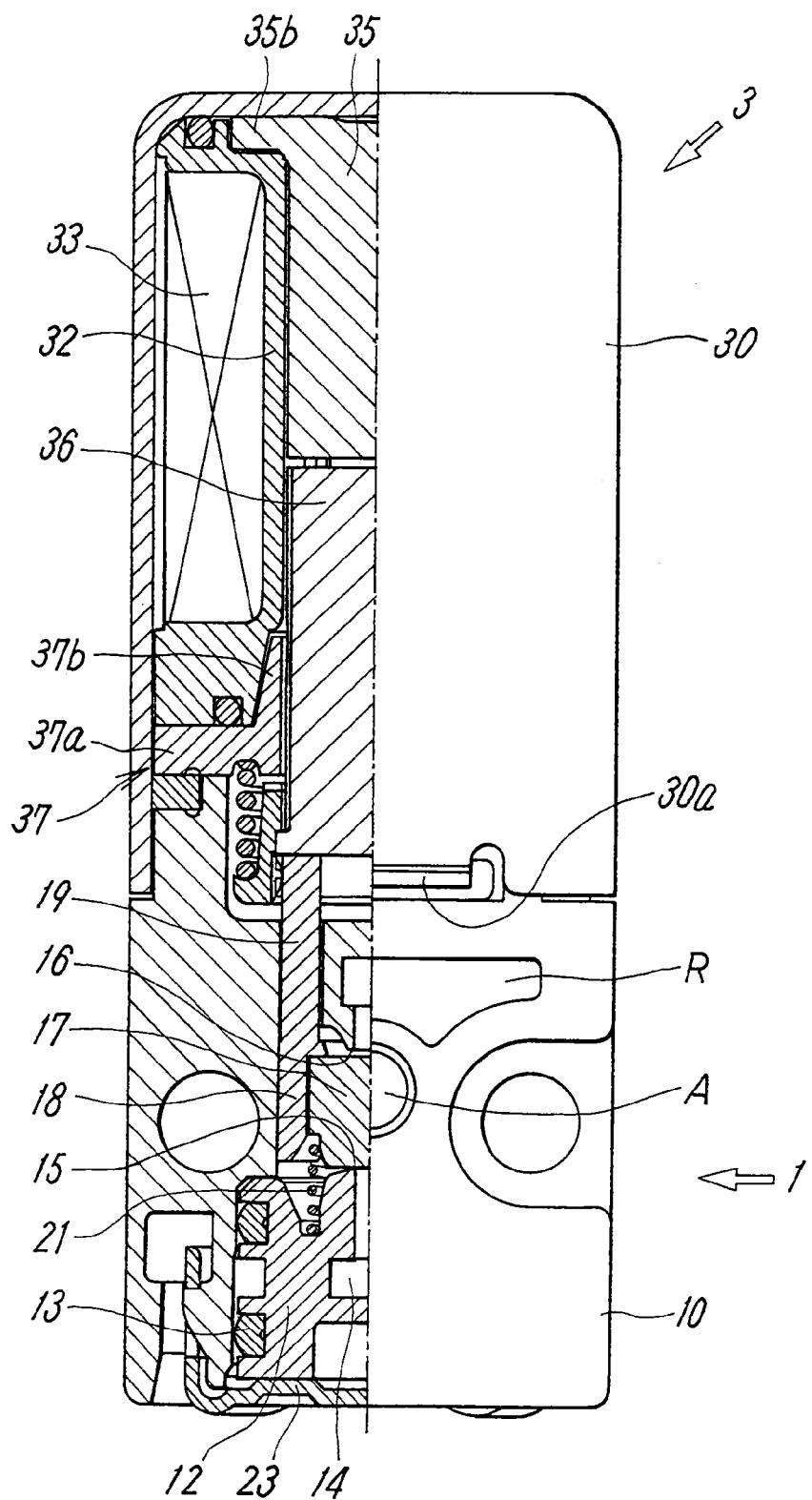
FIG. 2 is a half sectional side view of the embodiment.
Figure 3:
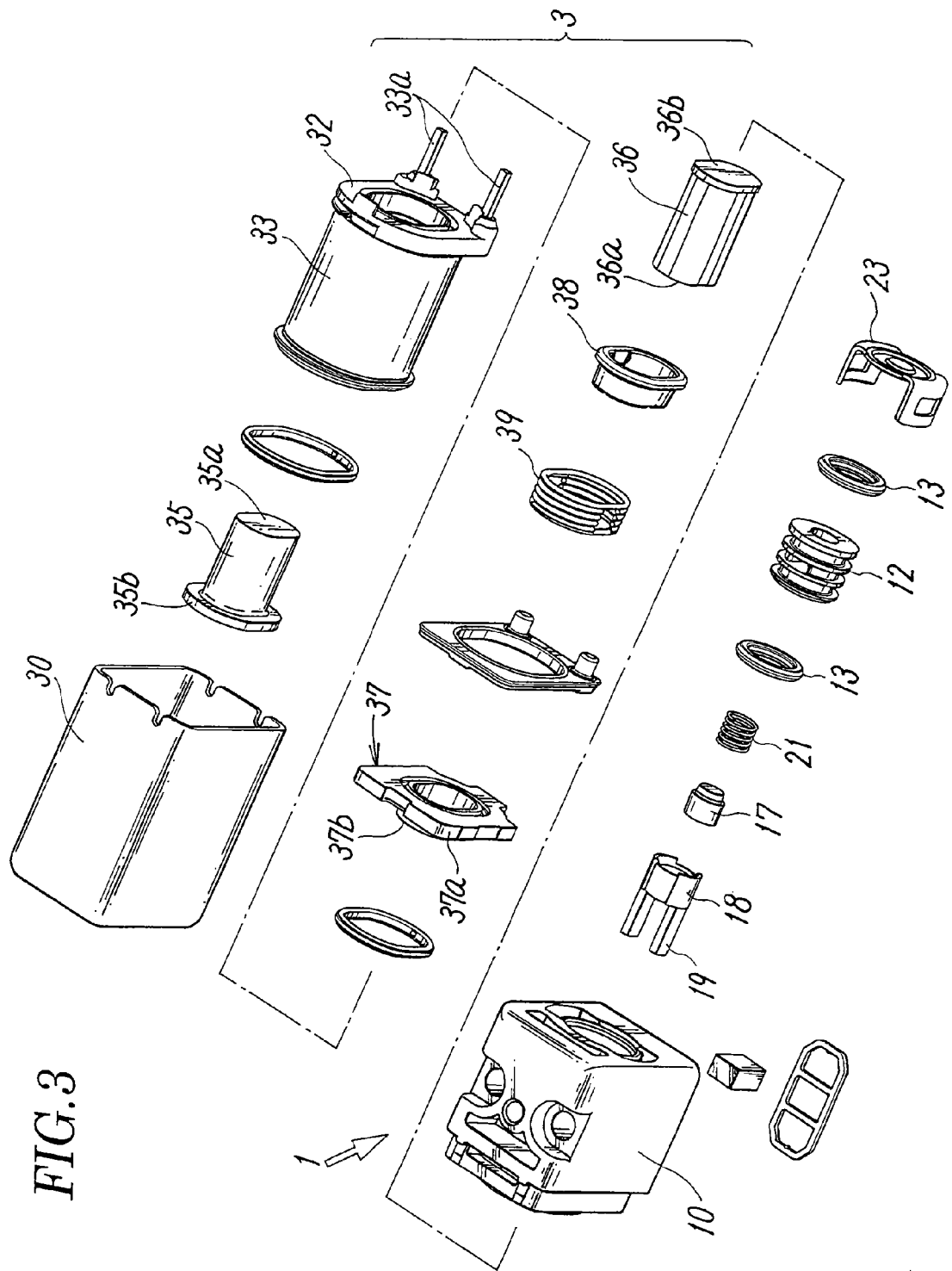
FIG. 3 is an exploded perspective view of the embodiment.

FIGS. 1 to 3 illustrate an embodiment of an electromagnetic valve including a solenoid for an electromagnetic valve according to the present invention, and particularly illustrate a specific exemplary overall configuration of the electromagnetic valve including the solenoid for the electromagnetic valve. The electromagnetic valve roughly includes a valve section 1 in which a flow passage of fluid is switched, and a solenoid section 3 that switches and drives a valve member in the valve section 1. The solenoid section 3 is formed by the solenoid for the electromagnetic valve of the present invention. FIGS. 1 and 2 illustrate a state in which an exciting coil in the solenoid section 3 is demagnetized.

The valve section 1 includes a valve body 10, and a valve chest 11 with which an input port P, an output port A, and a discharge port R communicate is provided in the valve body 10. A hole that forms the valve chest 11 is open at an end of the valve body 10 opposite the solenoid section 3, and is closed by a valve seat body 12 in a state in which the hole is sealed around its periphery by seal members 13. The valve seat body 12 has a flow passage 14 that communicates with the input port P. An inner end of the flow passage 14 communicates, in the center of the valve chest 11, with a supply valve seat 15 provided at a position opposing a discharge valve seat 16 communicating with the discharge port R. A valve member 17 is stored in the valve chest 11 between the supply valve seat 15 and the discharge valve seat 16.

The valve member 17 opens and closes the flow passage by being moved into contact with or separated from the supply valve seat 15 and the discharge valve seat 16 through energization or de-energization of the solenoid section 3. To cause the valve member 17 to perform the opening and closing operations through the solenoid section 3, the valve member 17 is stored in a holder 18 holding the valve member 17, a pair of pushrods 19 integrated with the holder 18 are led out toward the solenoid section 3 in the valve body 10 at a position across the discharge valve seat 16, and distal ends of the pushrods 19 are in contact with a below-described movable iron core 36 of the solenoid section 3 in a recess 10a provided in the valve body 10 between the valve body 10 and the solenoid section 3. Further, a valve spring 21 for biasing the valve member 17 toward the discharge valve seat 16 is provided between the valve member 17 and a spring receiving portion 20 provided around the supply valve seat 15 in the valve seat body 12. In the figures, reference numeral 23 denotes a presser member for fixing the valve seat body 12 to the valve body 10.

In contrast, the solenoid section 3 includes a hollow magnetic frame 30 of substantially rectangular transverse section. The magnetic frame 30 is open at one end and closed at the other end. A hollow bobbin 32 is stored in the magnetic frame 30, and an end of the bobbin 32 is in contact with the innermost portion of the magnetic frame 30 with a seal member 31 being disposed therebetween. An exciting coil 33 is wound around an outer periphery of the bobbin 32, and both ends of the exciting coil 33 are connected to coil terminals 33a (see FIG. 3).

In an elliptic center hole 32a of the bobbin 32, a stationary iron core 35 is provided with a rear end face, which has a flange portion 35b, being in contact with an inner surface of the magnetic frame 30. In the center hole 32a of the bobbin 32, the movable iron core 36 is also fitted slidably in a direction in which the movable iron core 36 moves into contact with and away from the stationary iron core 35. The stationary iron core 35 and the movable iron core 36 both have an elliptic sectional shape. Opposing end faces of the stationary iron core 35 and the movable iron core 36 have flat attracting-force acting surfaces 35a and 36a respectively. During energization of the exciting coil 33, the movable iron core 36 is attracted to the stationary iron core 35 by a magnetic attracting force acting on the attracting-force acting surfaces 35a and 36a.

The cross-sectional shape of the stationary iron core 35 is uniform except in the rear end portion where the flange portion 35b is provided. The movable iron core 36 is also uniform except in a front end portion where a flange portion 36b that catches a below-described cap 38 is provided.

The magnetic frame 30 is shaped like a cover surrounding the bobbin 32, and is in contact with a rear end face of the stationary iron core 35 opposite the attracting-force acting surface 35a so as to be connected to the stationary iron core 35 by a magnetic path. Further, the magnetic frame 30 is connected to the movable iron core 36 by a magnetic path via a hollow magnetic plate 37 provided near a front end portion of the movable iron core 36 opposite the attracting-force acting surface 36a and around the movable iron core 36.

The magnetic plate 37 includes a plate body 37a having a rectangular outer peripheral shape, an extending portion 37b provided integrally with an inner periphery of the plate body 37a such as to extend toward the stationary iron core 35 along a surface of the movable iron core 36, and an elliptic inner hole 37c. An outer peripheral surface of the plate body 37a is in contact with the inner peripheral surface of the magnetic frame 30 at the open end of the magnetic frame 30. The thickness of the extending portion 37b gradually decreases toward a distal end. The extension length of the extending portion 37b from the plate body 37a is more than the thickness of the plate body 37a. The inner hole 37c of the magnetic plate 37 is shaped like a hole that is uniform over the entire length. An inner peripheral surface 37d of the magnetic plate 37 opposes a part of an outer peripheral surface of the movable iron core 36 such as to be maximally close to the outer peripheral surface with a space a therebetween.

The center hole 32a of the bobbin 32 and the inner hole 37c of the magnetic plate 37 have the same shape. The cap 38 formed of synthetic resin is fitted on an outer periphery at a valve section 1 side end of the movable iron core 36 from a side of the attracting-force acting surface 36a, and is caught by the flange portion 36b at the front end of the movable iron core 36, so that the cap 38 does not come out forward. A return spring 39 is attached between the cap 38 and the magnetic plate 37, and the return spring 39 biases the movable iron core 36 in a direction away from the stationary iron core 35.

Therefore, a magnetic path is formed to reach from the stationary iron core 35 to the movable iron core 36 through the magnetic frame 30 surrounding the bobbin 32 and the magnetic plate 37 and to return from the movable iron core 36 to the stationary iron core 35 via a gap b. The gap b corresponds to a stroke of the movable iron core 36 during energization of the exciting coil 33. The above-described space a necessary to cause the movable iron core 36 to make a stroke without contact with the magnetic plate 37 is formed between the outer peripheral surface of the movable iron core 36 and the inner peripheral surface 37d of the magnetic plate 37 (see FIG. 4).

The solenoid section 3 is attached with a part 30a of the magnetic frame 30 being bent and caught by an upper part of the valve body 10. Thus, a distal end of the movable iron core 36 is located at a position in contact with the distal ends of a pair of pushrods 19 integrated with the holder 18 for the valve member 17 in the recess 10a between the valve body 10 and the solenoid section 3.

As illustrated in FIGS. 1 and 2, when the exciting coil 33 is de-energized in the electromagnetic valve having the above-described configuration, the movable iron core 36 is moved to a position separate from the stationary iron core 35 by the biasing force of the return spring 39, and pushes the valve member 17 via the pushrods 19. Hence, the valve member 17 closes the supply valve seat 15, and opens the discharge valve seat 16. The biasing force of the return spring 39 of the movable iron core 36 provided between the cap 38 and the magnetic plate 37 is set to be larger than the biasing force of the valve spring 21 for biasing the valve member 17 toward the discharge valve seat 16.

In contrast, when the exciting coil 33 is excited by energization, the movable iron core 36 is attracted to the stationary iron core 35 against the biasing force of the return spring 39. Hence, the valve member 17 opens the supply valve seat 15 and closes the discharge valve seat 16 with the biasing force of the valve spring 21.

In the embodiment illustrated in FIGS. 1 to 3, the cross sections of the stationary iron core 35, the movable iron core 36, the center hole 32a of the bobbin 32, and the inner hole 37c of the magnetic plate 37 are shaped like an ellipse formed by connecting ends of two opposing semicircles by straight lines. The cross-sectional shape is not limited to the elliptic shape, and can be circular as in a movable iron core 36 of FIG. 5 or can be substantially rectangular.

The above-described electromagnetic valve adopts a structure that will be described below with reference to FIGS. 4 to 7 in order to reduce the magnetic resistance resulting from the space a between the movable iron core 36 and the magnetic plate 37 only by a simpler structure change than in the solenoid for the electromagnetic valve of the related art. While the cross-sectional shape of the movable iron core 36, the stationary iron core 35, and the inner hole 37c of the magnetic plate 37 are circular for convenience in FIGS. 4 and 5, the structure is also similarly adopted when the cross-sectional shape is elliptic or rectangular.

Figure 4:
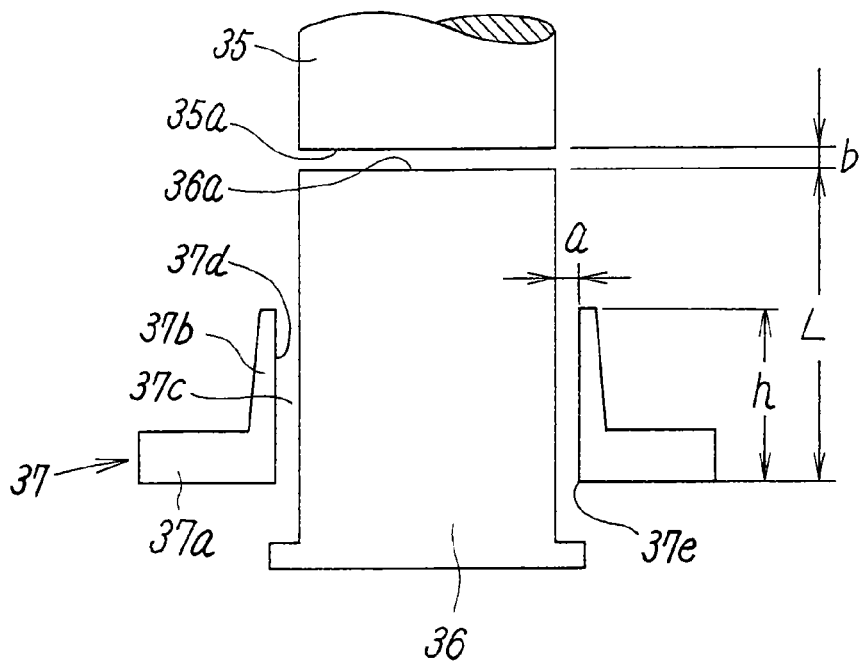
FIG. 4 is an explanatory view illustrating shape parameters of the solenoid in the embodiment.
Figure 5:
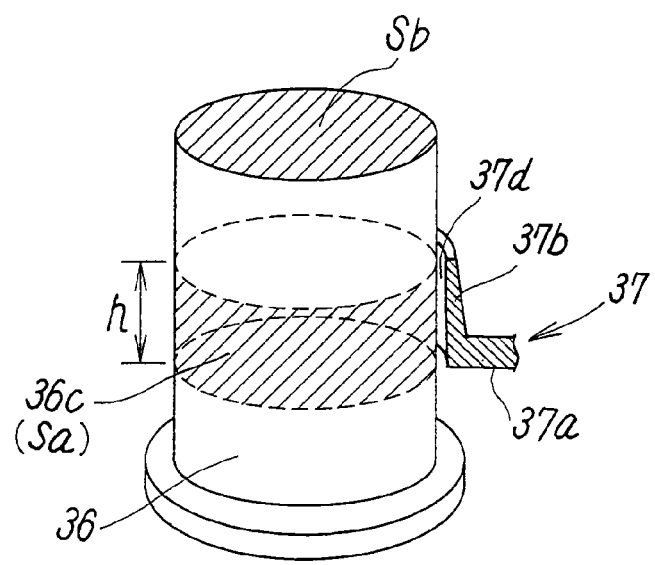
FIG. 5 is an explanatory perspective view illustrating shape parameters of a movable iron core in the embodiment.

Conclusively as illustrated in FIG. 5, the structure for reducing the magnetic resistance is such that an area $S_a$ of an opposing portion 36c (an obliquely shaded portion) of the outer periphery of the movable iron core 36 opposing the inner peripheral surface 37d of the magnetic plate 37 and a sectional area $S_b$ of a cross section of the movable iron core 36 orthogonal to the axis thereof satisfy the following condition:

$$K=S_a/S_b, K>1,$$

and such that, as illustrated in FIG. 4, an axial length h of the inner peripheral surface 37d of the magnetic plate 37 (hence, the opposing portion 36c of the movable iron core 36) and a length L from the attracting-force acting surface 36a of the movable iron core 36 located at a position separated from the stationary iron core 35 by the return spring 39 to a front end portion 37e of the magnetic plate 37 satisfy the following condition:

$$2 \leq K \leq [\text{value of } K \text{ when } h=L].$$

The above is more specifically described by using expressions. First, a magnetic resistance $R_a$ in the space a between the outer peripheral surface of the movable iron core 36 and the inner peripheral surface 37d of the magnetic plate 37 and a magnetic resistance $R_b$ in the gap (stroke of the movable iron core 36) b between the stationary iron core 35 and the movable iron core 36 are expressed as follows:

$$R_a = C \cdot a/S_a$$

$$R_b = C \cdot b/S_b$$

where $C=1/\mu=1/\mu_o \cdot \mu_s$ $\mu$=magnetic permeability [H/m]
$\mu_o$=magnetic permeability of a vacuum=$4\pi \times 10^{-7}$ [H/m]
$\mu_s$=relative magnetic permeability.

A combined resistance $R_t$ of the magnetic resistances $R_a$ and $R_b$ can be expressed as follows:

$$R_t = R_a + R_b = C(a/S_a + b/S_b).$$

When it is assumed that $C \approx 1$, the combined resistance $R_t$ can be expressed as follows:

$$R_t \approx (a \cdot S_b + b \cdot S_a)/S_a \cdot S_b.$$

In the above expressions, the space a between the inner peripheral surface 37d of the magnetic plate 37 and the movable iron core 36 and the gap b between the stationary iron core 35 and the movable iron core 36 both reduce magnetic efficiency. However, the gap b is an actual stroke of the movable iron core 36 and is generally designed so that $a \leq b$. In portions other than the gap (e.g., the space a), it is necessary that the magnetic resistance is not larger at least than in the gap b for the stroke of the movable iron core. Hence, to simplify calculation with the above expressions, when a=b, the following expression can be obtained:

$$R_t' = (S_b + S_a)/S_a \cdot S_b$$

where $R_t' = R_t/b$.

Here, when the area $S_a$ of the opposing portion 36c in the outer periphery of the movable iron core 36 and the sectional area $S_b$ of the movable iron core 36 in FIG. 5 satisfy the following condition:

$$K = S_a/S_b, K>1,$$

that is, when $S_a$ is regarded as K times of $S_b$ and this is substituted in the above expression of $R_t'$ and the expression is arranged, the following expression is obtained:

$$R_t' \times S_b = R_t'' = (K+1)/K = 1/Y$$

$$Y = K/(K+1) \quad (1).$$

According to Expression (1), the efficiency rises as Y increases.

Accordingly, when Expression (1) is differentiated to find the rate of change of Y when K changes in Expression (1), the following expression is obtained:

$$Y' = 1/(K+1)^2 \quad (2).$$

Figure 6:
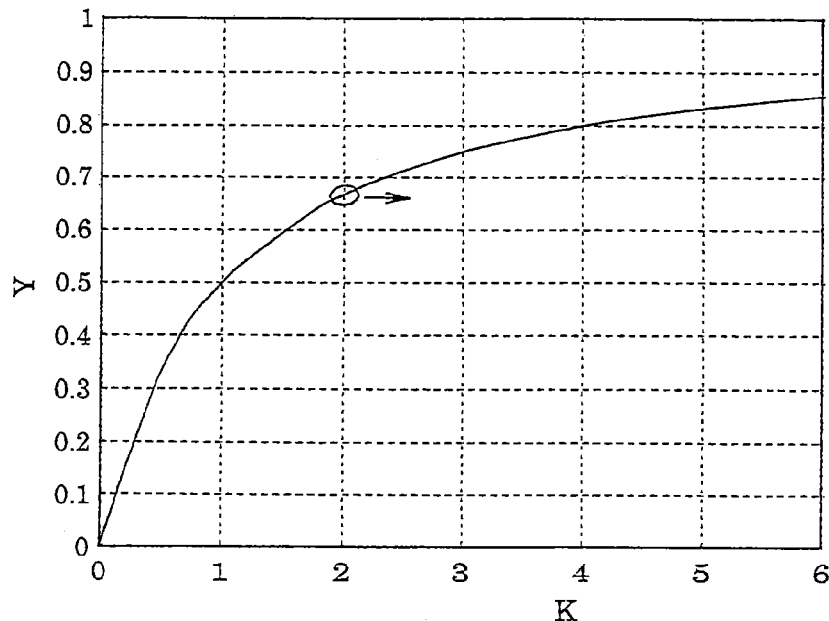
FIG. 6 is a graph showing the relationship in Expression (1) described below.
Figure 7:
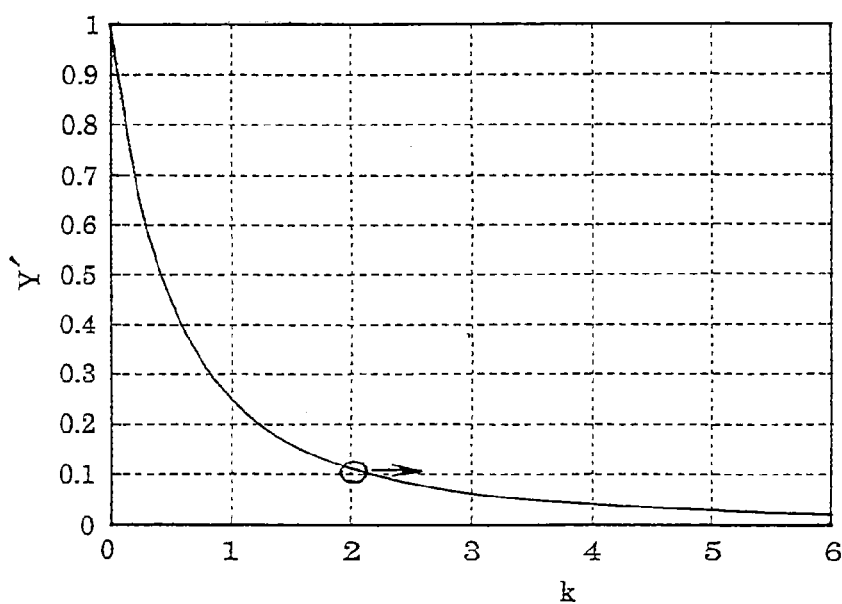
FIG. 7 is a graph showing the relationship in Expression (2) described below.

FIGS. 6 and 7 are graphs that visualize the changes of Y in Expression (1) and Y' in Expression (2). According to FIG. 7, when $K \geq 2$, the change in the rate of change decreases, the rate of change becomes 10% or less, and an efficiency of 65% or more can be obtained.

Therefore, when the length L is set as in FIG. 4, as described above, it is efficiently preferable to satisfy the following condition:

$$2 \leq K \leq [\text{value of } K \text{ when } h=L] \quad (3).$$

According to FIGS. 6 and 7, an efficiency of 75% or more can be obtained when $K \geq 3$, and an efficiency of 80% or more can be obtained when $K \geq 4$. These values are within a more desirable range as long as there is no production problem in the magnetic plate.

When the value K is made close to [value of K when h=L] according to Expression (3) described above, magnetic flux may leak from the distal end of the extending portion 37b of the magnetic plate 37 toward the stationary iron core 35. Since this is influenced by various parameters such as the shapes of the stationary iron core 35 and the movable iron core 36, it is not necessarily easy to describe what a value is taken. When the value of K is increased to an extent that such leakage of magnetic flux may occur, it is necessary to find, by experiment or by other methods beforehand, a distance d necessary to suppress the magnetic flux leaking from the distal end of the extending portion 37b of the magnetic plate 37 toward the stationary iron core 35 and to satisfy the following condition:

$$2 \leq K \leq [\text{value of } K \text{ when } h = L - d].$$

In this case, there is a room to consider the shape of the magnetic plate 37, for example, by minimizing the thickness of the distal end of the extending portion 37b of the magnetic plate 37.

REFERENCE SIGNS LIST

30: magnetic frame
32: bobbin
32a: center hole
33: exciting coil
35: stationary iron core
36: movable iron core
36c: opposing portion
35a, 36a: attracting-force acting surface
37: magnetic plate
37a: plate body
37b: extending portion
37c: inner hole
37d: inner peripheral surface
39: return spring

The invention claimed is:

1. A solenoid for an electromagnetic valve, comprising:
a bobbin on which an exciting coil is wound;
a stationary iron core mounted in a center hole of the bobbin and having an attracting-force acting surface at a front end of the stationary iron core;
a movable iron core slidably inserted in the center hole of the bobbin, and having an attracting-force acting surface opposing the attracting-force acting surface of the stationary iron core, the movable iron core being attracted to the stationary iron core by energization of the exciting coil and being made to separate from the stationary iron core by a return spring when the exciting coil is not energized;
a magnetic frame shaped like a cover surrounding the bobbin and connected to a rear end of the stationary iron core by a magnetic path; and
a magnetic plate provided around the movable iron core to form a magnetic path between the magnetic frame and the movable iron core,
wherein the magnetic plate includes
a plate body having an outer peripheral surface that is parallel to an axis of the center hole of the bobbin and is in contact with the magnetic frame, and
an extending portion provided on an inner peripheral side of the plate body to extend toward the stationary iron core along a surface of the movable iron core, the plate body and the extending portion being integrally formed by a single material, and a length of the extending portion from a surface of the plate body facing toward an end of the extending portion is more than a thickness of the plate body,
wherein an area Sa of an opposing portion of an outer periphery of the movable iron core opposing an inner peripheral surface of the magnetic plate and a sectional area Sb of a cross section of the movable iron core orthogonal to an axis thereof satisfy the following condition:

$K = Sa/Sb$, and wherein an axial length h of the inner peripheral surface of the magnetic plate and a length L from the attracting-force acting surface of the movable iron core located at a position separated from the stationary iron core by the return spring to a front end portion of the magnetic plate satisfy the following condition:

$2 \leq K$, and $h \leq L$.

2. The solenoid for the electromagnetic valve according to claim 1, wherein cross sections of the stationary iron core, the movable iron core, the center hole of the bobbin, and an inner hole of the magnetic plate have any of a circular shape, an elliptic shape, and a rectangular shape.

3. The solenoid for the electromagnetic valve according to claim 1, wherein a thickness of the extending portion of the magnetic plate is thinner than a thickness of the plate body, and the thickness of the extending portion gradually decreases toward a distal end.

4. A solenoid for an electromagnetic valve, comprising:
a bobbin on which an exciting coil is wound;
a stationary iron core mounted in a center hole of the bobbin and having an attracting-force acting surface at a front end of the stationary iron core;
a movable iron core slidably inserted in the center hole of the bobbin, and having an attracting-force acting surface opposing the attracting-force acting surface of the stationary iron core, the movable iron core being attracted to the stationary iron core by energization of the exciting coil and being made to separate from the stationary iron core by a return spring when the exciting coil is not energized;
a magnetic frame shaped like a cover surrounding the bobbin and connected to a rear end of the stationary iron core by a magnetic path; and
a magnetic plate provided around the movable iron core to form a magnetic path between the magnetic frame and the movable iron core,
wherein the magnetic plate includes
a plate body having an outer peripheral surface that is parallel to an axis of the center hole of the bobbin and is in contact with an inner peripheral surface of the magnetic frame, and
an extending portion provided on an inner peripheral side of the plate body to extend toward the stationary iron core along a surface of the movable iron core, the plate body and the extending portion being integrally formed by a single material, and
a length of the extending portion from a top surface of the plate body facing toward an end of the extending portion is more than a thickness of the plate body,
wherein an axial length of the inner peripheral surface of the magnetic plate is equal to or less than a length from the attracting-force acting surface of the movable iron core located at a position separated from the stationary iron core by the return spring to a front end portion of the magnetic plate, and wherein an area of an opposing portion of an outer periphery of the movable iron core opposing an inner peripheral surface of the magnetic plate is more than a sectional area of a cross section of the movable iron core orthogonal to an axis thereof.

5. The solenoid for the electromagnetic valve according to claim 4, wherein cross sections of the stationary iron core, the movable iron core, the center hole of the bobbin, and an inner hole of the magnetic plate have any of a circular shape, an elliptic shape, and a rectangular shape.

6. The solenoid for the electromagnetic valve according to claim 4, wherein a thickness of the extending portion of the magnetic plate is thinner than a thickness of the plate body, and the thickness of the extending portion gradually decreases toward a distal end.

* * * * *